United States Patent [19]
Seltzer

[11] 3,831,171
[45] Aug. 20, 1974

[54] REMOTE VISUAL READOUT
[75] Inventor: Daniel Arron Seltzer, Cincinnati, Ohio
[73] Assignee: Gamon-Calmet Industries, Inc., Florence, Ky.
[22] Filed: Mar. 2, 1973
[21] Appl. No.: 337,424

Related U.S. Application Data
[63] Continuation of Ser. No. 160,398, July 7, 1971, abandoned.

[52] U.S. Cl. ......... 340/347 DD, 324/51, 340/253 B, 340/253 M
[51] Int. Cl. ...................... G01r 31/02, H03k 13/24
[58] Field of Search ............ 324/51, 52, 53, 28, 74, 324/66, 67, 51; 340/347 DD, 253 B, 253 H, 253 N, 253 R, 146.1 R, 146.1 B, 146.2, 411, 253 B, 253 M, 347 CC; 235/92 EC, 92 EA; 178/69 G; 307/231, 157

[56] References Cited
UNITED STATES PATENTS
| | | | |
|---|---|---|---|
| 2,117,052 | 5/1938 | Bailey et al. | 178/69 G |
| 2,871,289 | 1/1959 | Cox et al. | 340/347 DD |
| 3,088,095 | 4/1963 | Delmege, Jr. | 235/92 EC |
| 3,176,269 | 3/1965 | Croad, Jr. | 235/92 EC |

Primary Examiner—Gareth D. Shaw
Assistant Examiner—Leo H. Boudreau
Attorney, Agent, or Firm—Lerner, David, Littenberg & Samuel

[57] ABSTRACT

A system is disclosed in which an information signal presented in a one out of 10 coded format is converted first to a binary coded decimal signal and then into a seven-line signal for driving a neon display tube. Circuitry for converting the one out of 10 signal into the binary coded decimal signal is shared by time multiplexed division to service four transducers each providing a one out of 10 signal. The one out of 10 to binary coded decimal converting circuitry includes circuitry for comparing the zero indication in the one out of 10 format with the decoded signal to check for and indicate broken wires leading thereto.

8 Claims, 3 Drawing Figures

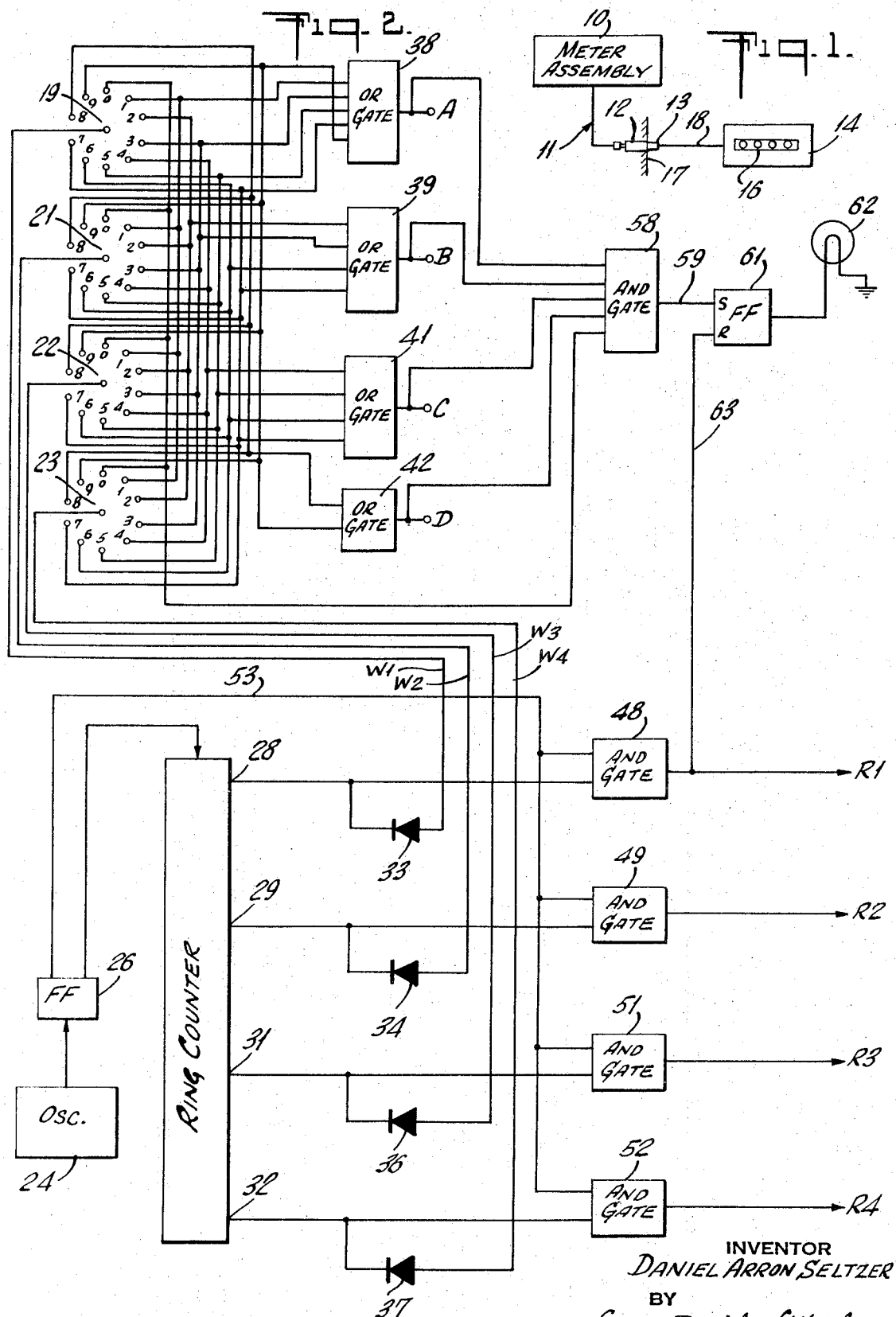

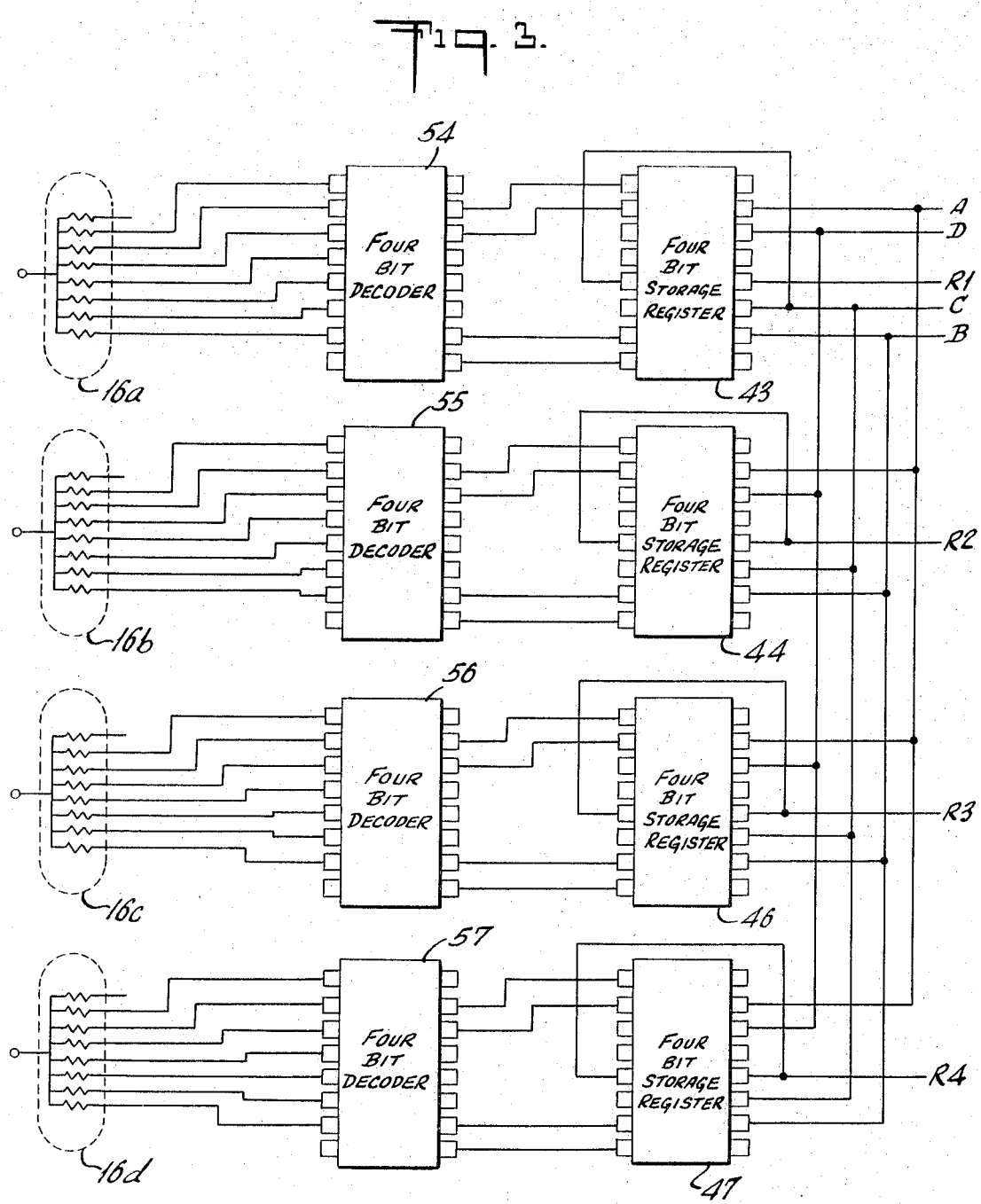

REMOTE VISUAL READOUT

This is a continuation, of application Ser. No. 160,398 filed July 7, 1971, now abandoned.

FIELD OF THE INVENTION

This invention relates to code converting circuitry and particularly to code converting circuitry with special circuitry included therein for checking system continuity.

BACKGROUND OF THE INVENTION

Presently the overwhelming majority of utility meters are read visually by having a meter reader go to the place where the meter is located and observing dial positions. The process of meter reading presents logistic as well as economic problems. Many meters to be read are located inside private premises such as in the basement of homes. Therefore, a meter reader cannot gain access to the meter if someone is not at home at the time he arrives. This often necessitates repeated visits to the premises in order to read the meter or the estimating of charges which produces additional complications.

For many years, systems have been proposed and devised for automating the meter reading process by converting the information contained in the angular positions of the meter shafts into electronically coded signals. These signals can then be transmitted to a remote location for either further processing, storage or reconversion to a visual indication.

Since the information to be read out of the meter is, in most cases, now available as a shaft position indication, one common form of transducer employed for converting that shaft position into an electronic signal includes a plurality of contacts arcuately spaced about the shaft and a single moving contact riding on the shaft. The moving contact makes and breaks connection with the arcuately spaced contacts providing one connection at a time. Typically, ten equally spaced contacts are employed, so that the signal provided is inherently in the format of a one out of ten code.

When it is desired to merely gain access to the information present inside the subscribers premises at the outside thereof, the various contacts are extended to the extremity of the premises by wires. The meter reader can then attach an appropriate reading device to the extended wire. The reading device can either record the information automatically or present the information for viewing and manual recording. When it is desired to reconvert the information back to a visual readout, it is necessary to do some signal processing.

Some systems for converting to a visual readout, now in existence, display the information in some code format. The meter reader using such a system must be trained to interpret the code. The use of the coded display minimizes the degree of signal processing necessary in the remote unit but it has been found that errors develop because of the inability of the meter reader to accurately interpret the coded information.

In order to display the information in a format which is easily understandable, one can employ common neon number tubes which light up the appropriate number in response to a coded signal applied thereto. It has been found that most available tubes require particular logic formats to provide appropriate numbers. It has also been found that in order to perform various logical signal processing operations such as error checking, it is desirable to have the information in a binary coded decimal format. Therefore, a convenient remote reading device would take the one out of ten signal inherently provided by the meter contacts, convert it into a binary coded decimal format for signal processing and thereafter reconvert it into the appropriate format necessary to drive the display tubes.

One of the difficulties which arises in a system of this nature is that one or more of the conductors carrying the one out of ten signal from the meter contacts to the periphery of the premises may be opened thereby giving improper indications when converted to the binary coded decimal format.

Therefore, it is an object of this invention to provide a new and improved code converting circuit.

It is a further object of this invention to provide a code converting circuit with special circuitry included therein for checking system continuity.

BRIEF DESCRIPTION OF THE INVENTION

With these and other objects in view, the present invention contemplates a system for monitoring the integrity of a code converting system which converts a first coded signal provided on a first set of terminals into a second coded signal provided on a second set of terminals. The system includes a monitoring device responsive to signals applied thereto for providing a system integrity signal and means for applying both the second coded signal and a signal from one of the first set of terminals to the monitoring circuit.

The system is particularly suitable where the first coded signal is arranged in a format to provide a signal only on one of the first set of terminals at a time and the second code is a binary code. The one of the first set of terminals is preferably chosen so as to decode into the binary code as all the same indications so that the monitoring device can be constructed from a simple "and" gate.

DESCRIPTION OF THE DRAWINGS

A more complete understanding of the invention can be had by reference to the following detailed description and drawings in which:

FIG. 1 is a block diagram of a meter reading arrangement in which the system of this invention may be employed; and FIGS. 2 and 3 taken together are a block diagram showing a system embodying the principles of this invention.

DETAILED DESCRIPTION OF THE INVENTION

Referring now to FIG. 1 we see a block diagram showing the positional location of various elements of a meter reading system in which a meter assembly 10 is located inside an inaccessible enclosure. A cable 11 (typically 14 wires) connects contacts in the meter assembly 10 to a connector 12 mounted in an outer wall 13 of the enclosure. A meter reading unit 14 having four display tubes 16 mounted therein is connected to the connector 12 by a mating connector 17 and a cable 18. Typically the cable 18 has the same number of conductors as the cable 11.

Referring now to FIGS. 2 and 3 taken together we see four meter switches 19 and 21 through 23 each having 10 spaced contacts numbered 1 through 0 [connected in parallel] and a center contact having a wiper arm (not shown) connected thereto and rotated by a meter indicating shaft (not shown). The meter switches 19 and 21 through 23 are located in the meter assembly 10 shown in FIG. 1. The remaining circuitry shown in FIGS. 2 and 3 are located in the meter reading unit 14, except for the fourteen leads leading from the meter switches 19 and 21 through 23 to the remaining circuitry. The fourteen leads electrically connect the meter assembly 10 with the meter reading unit 14 and are shown in FIG. 1 as the cables 11 and 18 and the two connectors 12 and 17.

When the circuitry is connected to the meter switches 19 and 21 through 23 as shown, a negative voltage is sequentially applied to the center contacts thereof. The negative voltage is supplied by a timing chain including a free running oscillator 24, a divide by two flip-flop 26 and a ring counter 27. The ring counter 27 is advanced by the flip-flop 26 to shift a negative signal sequentially between four output terminals 28, 29, 31 and 32. The signals successively supplied by the ring counter 27 are passed by diodes 33, 34, 36 and 37 to leads $W_1$ through $W_4$ (which make up the cables 11 and 18) to the center contacts of the switches 19 and 21 through 23. Therefore, power is supplied to only one of the meter switches 19 and 21 through 23 at any one time.

Four "or" gates 38, 39, 41 and 42 are connected to the parallely spaced contacts of the meter switches 19 and 21 through 23 to decode the one out of ten code inherently provided by actuation of the center contact thereof into a binary coded decimal output on terminals A, B, C and D. As is well known in the art, the "or" gate 38 is connected to the contacts 1, 3, 5, 7 and 9 to provide an output on the terminal A when any of these contacts have a negative signal thereon. Therefore, the output of A would be a signal indicating that the binary coded decimal output should have a 1 therein at the one position. The "or" gate 39 is connected to the terminals 2, 3, 6 and 7 so that the output B indicates that the binary coded decimal output should have a 1 at the two position. The "or" gate 41 is connected to the terminals 4, 5, 6 and 7 so that the output C indicates that a 1 should be present in the four position. The "or" gate 42 detects a signal on the leads 8 and 9 so that the output D indicates that a 1 should be present in the eight position. This is a well-known code and will provide the appropriate transition from one out of ten to binary coded decimal.

The outputs A, B, C and D are connected (FIG. 3) as inputs to 4 four-bit storage registers 43, 44, 46 and 47 in parallel. The outputs 28, 29, 31 and 32 of the ring counter 27 are also applied to four "and" gates 48, 49, 51 and 52 which are strobed by the flip-flop 26 via lead 53 to provide gating signals on output terminals $R_1$, $R_2$, $R_3$ and $R_4$. These gating signals are then applied to the four-bit storage registers 43, 44, 46 and 47. The signal on the lead 53 is out of phase with the drive to the ring counter 27 so that the output on the leads A, B, C and D have time to settle down before they are transferred to the respective storage registers 43, 44, 46 and 47.

The four-bit storage registers 43, 44, 46 and 47 successively sample the leads A, B, C and D in synchronism with the actuation of the meter switches 19, 21, 22 and 23. The outputs of the four-bit storage registers 43, 44, 46 and 47 are passed through four-bit decoder circuits 54, 55, 56 and 57 to drive decimal display tubes 16a through 16d. The storage registers 43, 44, 46 and 47 are employed to enable the sampling of the meter switches 19, 21, 22 and 23 at a relatively slow rate without having the display tubes 16a through 16d flicker. The four-bit decoders 54, 55, 56 and 57 are employed to convert from the binary coded decimal stored in the four-bit storage registers 43, 44, 46 and 47 to an appropriate code for driving the display tubes 16a through 16d.

As will be noted by looking at the contacts to which the "or" gates 38, 39, 41 and 42 are connected that a zero will be indicated in binary coded decimal without having the zero contact on the meter switches 19, 21, 22 and 23 connected to the decoding circuitry. Therefore, if a wire were broken a zero would be indicated when in fact some other number should be indicated.

To overcome this difficulty, in accordance with this invention, the zero contact on each of the meter switches 19, 21, 22 or 23 are brought as an input to an "and" gate 58. The outputs A, B, C and D of the "or" gates 38, 39, 41 and 42 are applied as additional inputs to the "and" gate 58. In this way, if zeros are present on all the leads A, B, C and D indicating a zero and a negative signal is not present on the zero lead, the "and" gate 58 will provide an output signal. It should be appreciated that with all other numbers other than zero, one of the outputs A, B, C or D would have a negative signal thereon. Therefore, under all proper operating circumstances, the "and" gate 58 should supply no output signal because either with zero present on the leads A, B, C and D, the zero lead will have a negative signal or else one of the other outputs A, B, C or D will provide a negative signal.

Therefore, the output of "and" gate 58 is applied by a lead 59 to a set input of flip-flop 61. When the flip-flop 61 is set, it lights a lamp 62 which indicates a system failure has occurred. The output $R_1$ from the "and" gate 48 is applied to the reset input of the flip-flop 61 by a lead 63 to periodically reset the flip-flop 61. Therefore, in this embodiment if a failure is indicated by the "and" gate 58, it will periodically set the flip-flop 61 which will be periodically reset by the $R_1$ output of the "and" gate 48. Since the $R_1$ output of the "and" gate 48 occurs once for each complete scanning of the switches 19 and 21 through 23. Any broken contact will light the light 62 by having the flip-flop 61 reset by the $R_1$ output. The light 62 will flash on and off if a broken contact is present.

It should be appreciated of course that various logic systems are available which include "nand" gates and "nor" gates thereby providing inversions of signals. In such case it is well known in the art to insert inverter circuits in appropriate signal paths to provide the proper logic functions.

It should be appreciated that while this invention has been disclosed with respect to a specific embodiment thereof, numerous others will become obvious to those of ordinary skill in the art in light thereof.

What is claimed is:

1. A monitoring system including:
   converting means for converting a signal coded in a first code, which always provides a predetermined signal indication on a predetermined number of a first set of terminals, into a second code; said second code being a binary code in which a "one" or "zero" is always provided as a signal indication on each of a second set of terminals;

means for connecting all but one of said first set of terminals to said converting means;

monitoring means responsive to signal indications applied thereto for providing a system integrity monitoring signal;

means for connecting each of said second set of terminals to said monitoring means; and means for connecting said one of said first set of terminals not connected to said converting means to said monitoring means.

2. The system as defined in claim 1 in which said predetermined number is one; and said predetermined indication on said one of said first set of terminals converts into said binary code as all the same indication on all of said second set of terminals.

3. The system as defined in claim 2 in which said monitoring means performs a logical "and" function.

4. The system as defined in claim 1 also including:
means for periodically providing said first coded signal on said first set of terminals;
means responsive to said system integrity monitoring signal for providing a first physical indication; and
means for periodically resetting said first physical indication providing means.

5. The system as defined in claim 4 in which said first physical indication providing means is reset once for each predetermined number of times said first coded signal is provided.

6. The system as defined in claim 5 in which said physical indication is the shining of a light so that said light blinks on and off when said system integrity monitoring signal is provided.

7. The system as defined in claim 6 in which said predetermined number is one and said predetermined indication on said one of said first set of terminals converts into said binary code as all the same indications on all of said second set of terminals.

8. The system as defined in claim 7 in which said monitoring means performs a logical "and" function.

* * * * *